(12) United States Patent
Page

(10) Patent No.: US 7,583,674 B2
(45) Date of Patent: Sep. 1, 2009

(54) SWITCH AND METHOD FOR SUPPORTING INTERNET PROTOCOL (IP) NETWORK TUNNELS

(75) Inventor: Gregory G. Page, Sandy, UT (US)

(73) Assignee: Alcatel Lucent, Paris (FR)

( * ) Notice: Subject to any disclaimer, the term of this patent is extended or adjusted under 35 U.S.C. 154(b) by 358 days.

(21) Appl. No.: 11/683,350

(22) Filed: Mar. 7, 2007

(65) Prior Publication Data

US 2008/0117910 A1 May 22, 2008

Related U.S. Application Data

(60) Provisional application No. 60/866,493, filed on Nov. 20, 2006.

(51) Int. Cl.
H04L 12/56 (2006.01)

(52) U.S. Cl. .................. 370/392; 370/401; 370/474

(58) Field of Classification Search ......... 370/389, 370/392, 400, 401, 419, 474, 395.6, 465–467; 709/230, 236, 238, 245, 249
See application file for complete search history.

(56) References Cited

U.S. PATENT DOCUMENTS

| 6,157,644 | A  | * | 12/2000 | Bernstein et al. | 370/392 |
|---|---|---|---|---|---|
| 6,452,939 | B1 | * | 9/2002  | Yang et al. | 370/465 |
| 6,647,428 | B1 | * | 11/2003 | Bannai et al. | 709/245 |
| 6,665,725 | B1 | * | 12/2003 | Dietz et al. | 709/230 |
| 6,721,353 | B1 | * | 4/2004  | Taubert et al. | 375/220 |
| 6,909,713 | B2 | * | 6/2005  | Magnussen et al. | 370/389 |
| 6,944,168 | B2 | * | 9/2005  | Paatela et al. | 370/401 |
| 6,985,488 | B2 | * | 1/2006  | Pan et al. | 370/395.3 |
| 6,990,121 | B1 | * | 1/2006  | Stiles et al. | 370/498 |
| 7,124,205 | B2 | * | 10/2006 | Craft et al. | 709/250 |
| 7,126,952 | B2 | * | 10/2006 | Hooper et al. | 370/401 |
| 7,133,404 | B1 | * | 11/2006 | Alkhatib et al. | 370/392 |
| 7,333,484 | B2 | * | 2/2008  | Henderson et al. | 370/389 |
| 7,333,510 | B1 | * | 2/2008  | Hies et al. | 370/467 |
| 7,349,427 | B1 | * | 3/2008  | Canning et al. | 370/466 |
| 7,403,533 | B2 | * | 7/2008  | Lee | 370/395.6 |
| 2002/0186705 | A1 | * | 12/2002 | Kadambi et al. | 370/452 |
| 2003/0152078 | A1 | * | 8/2003  | Henderson et al. | 370/389 |

OTHER PUBLICATIONS

S. Hanks et al. "Generic Routing Encapsulation (GRE)" IETF RFC 1701/RFC 1701, 9 pages, Oct. 1994.
S. Hanks et al. "Generic Routing Encapsulation over IPv4 Networks" IETF RFC 1702/RFC 1702, 5 pages, Oct. 1994.
D. Farinacci et al. "Generic Routing Encapsulation (GRE)" IETF RFC 2784/RFC 2784, 10 pages, Mar. 2000.
G. Dommety "Key and Sequence Number Extensions to GRE" IETF RFC 2890/RFC 2890, 8 pages, Sep. 2000.

* cited by examiner

Primary Examiner—Ajay P Cattungal

(57) ABSTRACT

A switch and a method are described herein that are capable of supporting a "new" IP network tunnel even though the switch has an "old" application specific integrated circuit (ASIC) that did not originally support the routing of a packet with the "new" tunnel type (i.e., the "new" tunnel type was developed and implemented after the design of the "old" ASIC).

13 Claims, 7 Drawing Sheets

SWITCH AND METHOD FOR SUPPORTING INTERNET PROTOCOL (IP) NETWORK TUNNELS

CLAIMING BENEFIT OF PRIOR FILED U.S. APPLICATION

This application claims the benefit of U.S. Provisional Application Ser. No. 60/866,493 filed on Nov. 20, 2006 and entitled "Method for Supporting IP Network Tunnels in Systems that Use IP Routing Capable ASICs (but Do Not Support Tunnel Type) Without Using Software Routing Table Lookups". The contents of this document are hereby incorporated by reference herein.

TECHNICAL FIELD

The present invention relates to a switch and method for supporting a "new" IP network tunnel even though the switch has an "old" application specific integrated circuit (ASIC) that did not originally support the routing of a packet utilizing the "new" tunnel type (i.e., the "new" tunnel type was developed and implemented after the design of the "old" ASIC).

BACKGROUND

The following abbreviations are herewith defined, at least some of which are referred to in the following description associated with the prior art and the present invention.

| | |
|---|---|
| ARP | Address Resolution Protocol |
| ASIC | Application Specific Integrated Circuit |
| CPU | Central Processing Unit |
| GRE | Generic Routing Encapsulation Protocol |
| IP | Internet Protocol |
| MAC | Media Access Control |
| MPLS | Multi-Protocol Label Switch |
| VLAN | Virtual Local Area Network |
| VPN | Virtual Private Network |

In the communications field, it is common for switches to utilize a routing tunnel to route packets between two networks that are connected to one another through a common network. Typically, the switch utilizes the routing tunnel by encapsulating a layer 3 protocol packet (e.g., IPv4, IPv6, IPX) into another layer 3 protocol packet and then forwarding the encapsulated packet to the other switch through the common network. Two exemplary scenarios in which routing tunnels have been used are discussed next with respect to FIGS. 1 and 2 (PRIOR ART).

Referring to FIG. 1 (PRIOR ART), there is a diagram which is used to help explain one scenario where a routing tunnel 102 is used to route packets between two networks 104a and 104b (which both implement one protocol) through a common network 106 (which implements a different protocol). In this scenario, assume there are two IPv6 networks 104a and 104b (networks A and B) which respectively have two IPv6 switches 108a and 108b that are connected to one another via an IPv4 internet 106. In this case, the two IPv6 switches 108a and 108b can use an IPv6 over IPv4 tunnel 102 to transport packets to each other through the IPv4 network 106.

Referring to FIG. 2 (PRIOR ART), there is a diagram which is used to help explain another scenario where a routing tunnel 202 is used to route packets between two networks 204a and 204b (which both implement one protocol) through a common network 206 (which implements the same protocol). In this scenario, assume there is a company which has two IPv4 networks 204a and 204b (networks A and B) and wants to create a VPN so they can securely connect their two IPv4 networks 204a and 204b together through a public IPv4 internet 206. To accomplish this, the company would use two IPv4 switches 208a and 208b that can set-up an encrypted IPv4 tunnel 202 to securely transport packets through the public IPv4 internet 206.

These two exemplary scenarios and other scenarios can be easily implemented if the two switches 108a, 108b, 208a and 208b have ASICs (hardware) therein that were designed to support the particular type of routing tunnel 102 and 202. However, it is common that a "new" tunnel type be defined and implemented but is not supported by the "old" ASICs within the switches 108a, 108b, 208a and 208b. In this situation, the switches 108a, 108b, 208a and 208b will either not support the new routing tunnel or they will need to use software (i.e., CPU) to support the new routing tunnel. The former is not desirable because no new routing tunnels would ever be used by the switches. The later is not desirable because it can take a lot of CPU processing time within the switches to support a new routing tunnel. A detailed discussion is provided next about how a switch can support a new routing tunnel completely within software (i.e., the CPU).

Referring to FIG. 3 (PRIOR ART), there is a block diagram which is used to help explain how a traditional switch 300 implements a "new" routing tunnel completely within software when the "old" ASIC does not support the "new" routing tunnel. As shown, the traditional switch 300 includes an ASIC 302 which has ports 304, an IP routing logic unit 306, a routing/ARP table 308, an interface table 310 and an egress packet logic unit 312. In addition, the traditional switch 300 includes a CPU 314 which has a device driver 316, an IP protocol stack 318, a routing/ARP table 320 and an interface table 322. The steps associated with how the traditional switch 300 implements a "new" routing tunnel completely within software (i.e., the CPU 314) are as follows:

1-2. One of the ports 304 receives a packet 324 and recognizes that the packet 324 is a routed IP packet 324 and as a result forwards the packet 324 to the IP routing logic unit 306. FIG. 4A (PRIOR ART) is a diagram illustrating the different fields of the exemplary packet 324 which include a "Destination MAC" field 402 (containing a Router MAC address for ingress VLAN), a "Source MAC" field 404 (containing a source MAC address), a "Protocol Type" field 406 (containing 0x800 which indicates that the packet 324 is an IP packet 324) and an "Original IP Header" field 408 (note: the original packet 324 also contains additional fields 410 but these particular fields 410 are not relevant to the present discussion).

3-5. The IP routing logic unit 306 receives the packet 324 and then takes the destination IP address in the "Original IP Header" and performs a table lookup in the routing/ARP table 308 and learns that the packet 324 is to be routed in a new tunnel which is not supported by the hardware (i.e., the ASIC 302). In this situation, the IP routing logic unit 306 forwards the packet 324 to the CPU 314 and in particular the device driver 316 so that the packet 324 can be routed completely within the software of the switch 302.

6. The device driver 316 (packet dispatcher 316) receives the packet 324 and forwards that packet 324 to the IP protocol stack 318.

7. The IP protocol stack 318 upon receiving the packet 324 takes the destination IP address in the "Original IP Header" and performs a first table lookup in the routing/ARP table 320 to determine the egress interface (tunnel header information) of the packet 324 and in this example the egress interface happens to be a GRE tunnel (note 1: many other types of new tunnels in addition to the GRE tunnel such as a MPLS tunnel can be supported within software) (note 2: the first table lookup does not include an ARP lookup).

8. The IP protocol stack 318 reformats the packet 324 such that the re-formatted packet 326 has the tunnel header information placed in a new "Tunnel IP Header/GRE" field 412 while the "Destination MAC" field 402, the "Source MAC" field 404 and the "Protocol Type" field 406 are all removed therefrom. FIG. 4B (PRIOR ART) is a diagram illustrating the different fields of an exemplary re-formatted packet 326 which include a "Tunnel IP Header/GRE" field 412 and an "Original IP Header" field 408' (note 1: the TTL is decremented within the "Original IP Header" field 408') (note 2: the re-formatted packet 326 also contains the additional fields 410).

9. The IP protocol stack 318 then takes the re-formatted packet 326 and in particular the IP destination address from the "Tunnel IP Header/GRE" field 412 and performs a second table lookup within the routing/ARP table 320 and the interface table 322. In response to the second table lookup, the IP protocol stack 310 receives the destination MAC address and the egress port identifier from the routing/ARP table 320 and also receives the source MAC address and the VLAN identifier from the interface table 322.

10. The IP protocol stack 318 reformats the packet 326 such that the second re-formatted packet 328 has added thereto the destination MAC address, the source MAC address and the VLAN information. FIG. 4C (PRIOR ART) is a diagram illustrating the different fields of an exemplary second re-formatted packet 328 which includes a "Next Hop MAC" field 414 (containing the destination MAC address), a "Router MAC for Egress VLAN" field 416 (containing the source MAC address), a "Protocol Type" field 406' (containing 0x800 which indicates that the packet 328 is an IP packet 328), a "Tunnel IP Header/GRE" field 412 and an "Original IP Header" field 408" (note 1: the TTL is decremented within the Original IP Header field 408") (note 2: the second re-formatted packet 328 also contains the additional fields 410) (note 3: the VLAN information is used when forwarding the second re-formatted packet 328).

11. The IP protocol stack 318 routes the second re-formatted packet 328 to the device driver 316 (packet dispatcher 316).

12. The device driver 316 (packet dispatcher 316) routes the second re-formatted packet 328 to the egress packet logic unit 312 (which is located within the ASIC 302).

13-14. The egress packet logic unit 312 routes the second re-formatted packet 328 to the correct egress port 304 which then forwards the second re-formatted packet 328 from a specific tunneled interface on a specific egress path to the next switch 108b (for example) which de-tunnels the second re-formatted packet 328.

This is how the traditional switch 300 can implement a "new" routing tunnel completely within the software (i.e., the CPU 314) when the "old" ASIC 302 does not support the "new" routing tunnel. However, this way is not that efficient because the IP Protocol Stack 318 has to perform two table lookups (see steps 7 and 9) and also has to reformat packet 324 into packet 326 and then reformat that packet 326 into packet 328 (see steps 8 and 10). This is not an efficient use of CPU processing time especially if the IP Protocol Stack 318 has to perform steps 7-10 for a very large number of packets. Thus, there is a need for a switch that can more effectively implement a "new" routing tunnel when the "old" ASIC does not support the new routing tunnel. This need and other needs are satisfied by the present invention.

SUMMARY

In one aspect, the present invention provides a switch that has an ASIC and CPU where the ASIC receives a first formatted packet, performs a first table lookup using a destination address in the first formatted packet, revises the first formatted packet to be a second formatted packet which has a special destination MAC address added thereto and routes the second formatted packet to the CPU which recognizes that the second formatted packet is to be a tunneled packet and performs a second table lookup using at least a portion of the special destination MAC address and revises the second formatted packet to be a third formatted packet which is the tunneled packet that is subsequently outputted from a specific tunnel interface on a specific egress path.

In another aspect, the present invention provides a method for routing a packet at a switch which includes an ASIC and a CPU. In this method, the ASIC performs the following steps: (1) receiving a first formatted packet; (2) performing a first table lookup using a destination address located in the first formatted packet to obtain a special destination address; (3) revising the first formatted packet to be a second formatted packet which has the special destination address added thereto; and (4) routing the second formatted packet. Then, the CPU performs the following steps: (1) receiving the second formatted packet; (2) recognizing that the second formatted packet is to be a tunneled packet; (3) performing a second table lookup using at least a portion of the special destination address to obtain header information; (4) revising the second formatted packet to be a third formatted packet which has the header information added thereto; and (5) routing the third formatted packet. Thereafter, the ASIC performs the following steps: (1) receiving the third formatted packet; and (2) outputting the third formatted packet from a specific tunnel interface on a specific egress path.

In yet another aspect, the present invention provides a switch comprising an ASIC and a CPU where the ASIC includes: (1) a port that receives a first formatted packet; and (2) an IP routing logic unit that receives the first formatted packet and performs a first table lookup using a destination address in the first formatted packet to obtain a special destination address and then revises the first formatted packet to be a second formatted packet which has the special destination address added thereto and then routes the second formatted packet. The CPU includes: a (1) device driver that receives the second formatted packet and recognizes that the second formatted packet is to be a tunneled packet; and (2) a fast path handler that performs a second table lookup using at least a portion of the special destination address therein to obtain header information and then revises the second formatted packet to be a third formatted packet which has the header information added thereto and then routes the third formatted packet. The ASIC further includes: (1) an egress packet logic unit that receives the third formatted packet and routes the third formatted packet; and (2) the port receives the third formatted packet and outputs the third formatted packet which is a tunneled packet from a specific tunnel interface on a specific egress path.

In still yet another aspect, the present invention provides switch including a first ASIC, a second ASIC and a CPU. The first ASIC includes: (1) a port that receives a first formatted packet; and (2) an IP routing logic unit that receives the first formatted packet and performs a first table lookup (which is populated by the CPU) using a destination address in the first formatted packet to obtain a special destination address and then revises the first formatted packet to be a second formatted packet which has the special destination address added thereto and then routes the second formatted packet. The second ASIC includes: (1) a fast path handler that receives the second formatted packet and recognizes that the second formatted packet is to be a tunneled packet and performs a second table lookup (which is populated by the CPU) using at least a portion of the special destination address therein to obtain header information and then revises the second formatted packet to be a third formatted packet which has the header information added thereto and then routes the third formatted packet. The first ASIC further includes: (1) an egress packet logic unit that receives the third formatted packet and routes the third formatted packet; and (2) the port receives the third formatted packet and outputs the third formatted packet which is a tunneled packet from a specific tunnel interface on a specific egress path.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

Figure 1:
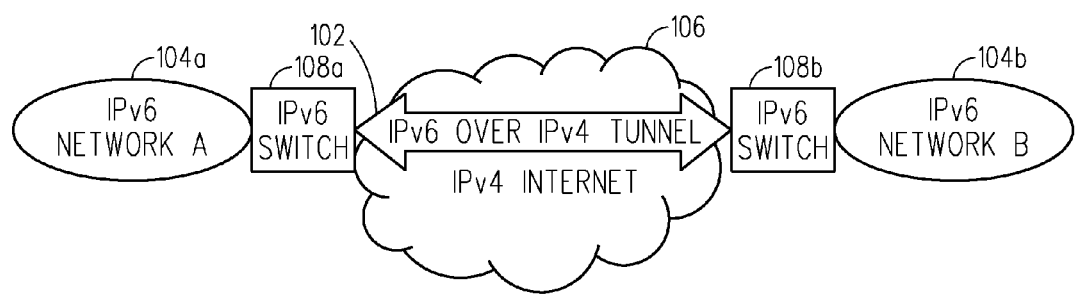
FIG. 1 (PRIOR ART) is a diagram which is used to help explain an exemplary scenario where a routing tunnel is used to route packets between two networks (which both implement one protocol) through a common network (which implements a different protocol)
Figure 2:
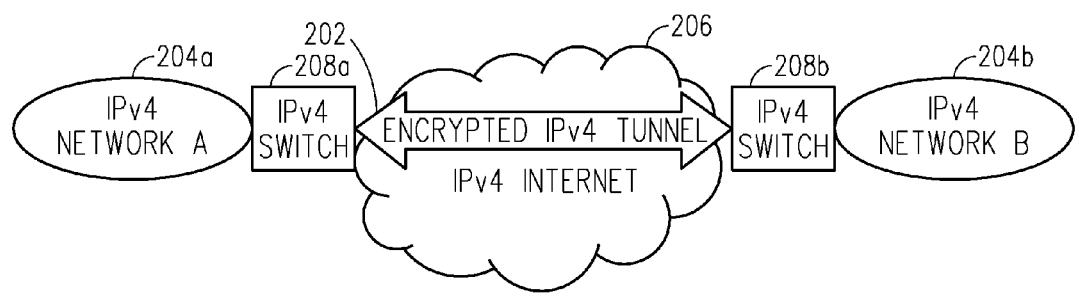
FIG. 2 (PRIOR ART) is a diagram which is used to help explain another exemplary scenario where a routing tunnel is used to route packets between two networks (which both implement one protocol) through a common network (which implements the same protocol)
Figure 3:
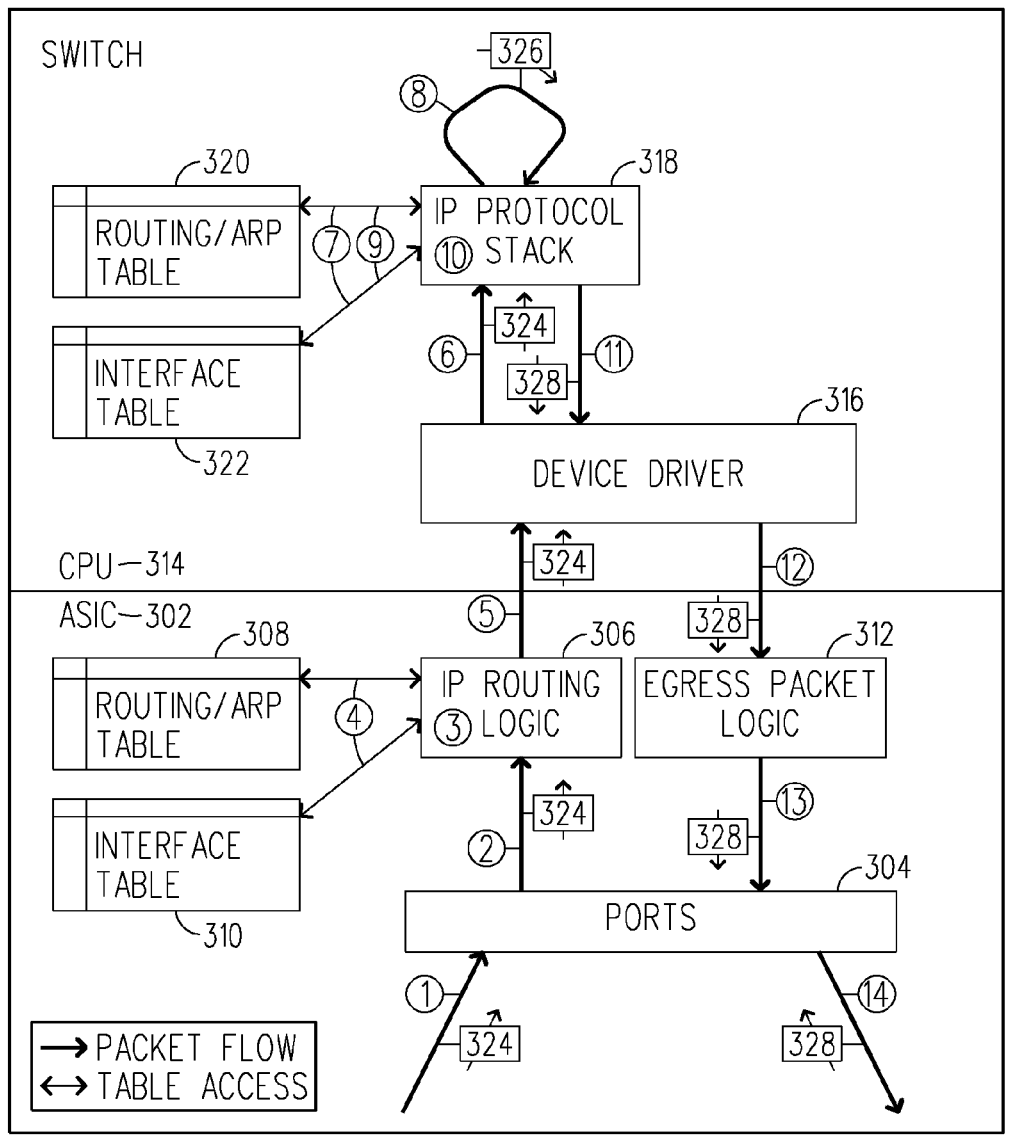
FIG. 3 (PRIOR ART) is a block diagram which is used to help explain how a traditional switch implements a "new" routing tunnel completely within the CPU (i.e., the software) when a "old" ASIC located therein does not support the "new" routing tunnel.
Figure 4A:
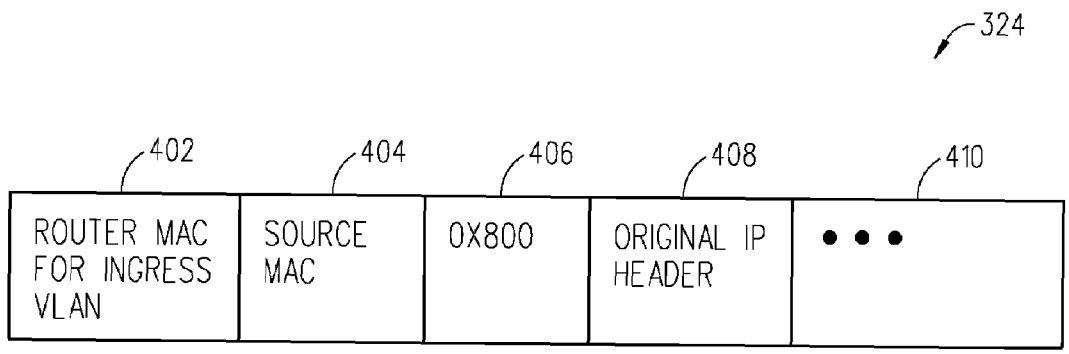
FIGS. 4A-4C (PRIOR ART) are diagrams which illustrate the different fields of a packet as it is re-formatted two different times by the software (i.e., the CPU) within the switch shown in FIG. 3.
Figure 4B:
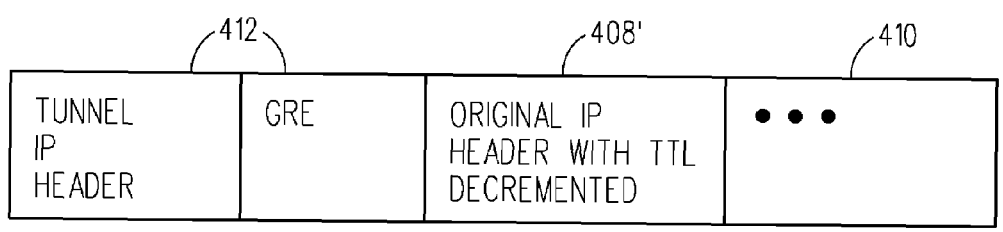
Figure 4C:
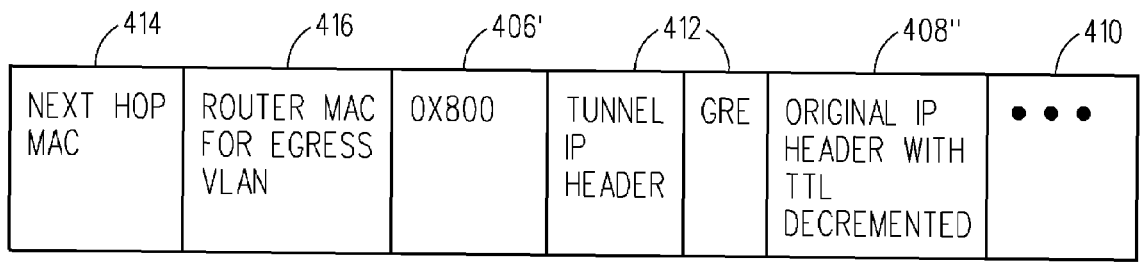
Figure 5:
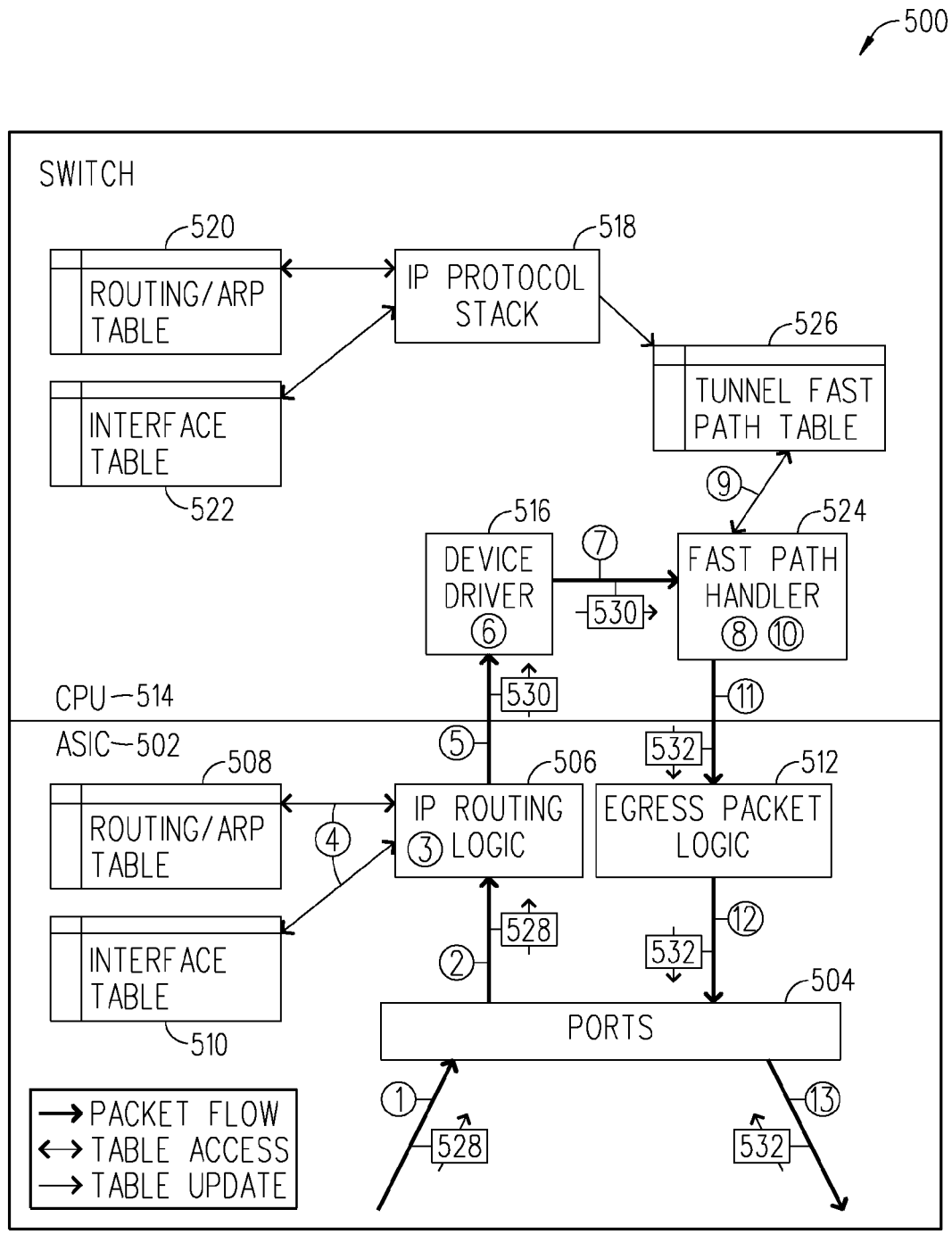
FIG. 5 is a block diagram which is used to help explain how a switch with an "old" ASIC is able to implement a "new" routing tunnel more effectively than the traditional switch shown in FIG. 3 in accordance with a first embodiment the present invention.
Figure 6A:
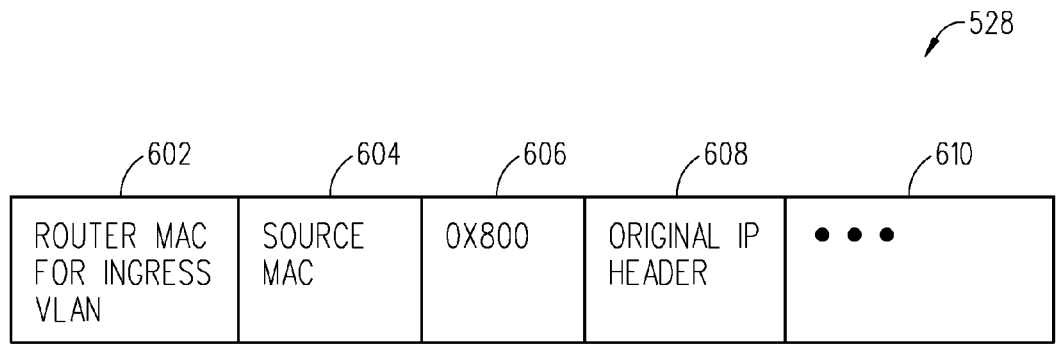
FIGS. 6A-6C are diagrams which illustrate the different fields of the packet as it is re-formatted two different times within the switch shown in FIG. 5 in accordance with the first embodiment of the present invention.

Referring to FIG. 5, there is a block diagram of a switch 500 in accordance with a first embodiment of the present invention. As shown, the switch 500 includes an ASIC 502 which has ports 504, an IP routing logic unit 506, a routing/ARP table 508, an interface table 510 and an egress packet logic unit 512. In addition, the switch 500 includes a CPU 514 which has a device driver 516, an IP protocol stack 518, a routing/ARP table 520, an interface table 522, a fast path handler 524 and a tunnel fast path table 526. The steps associated with how the switch 500 is able to implement a "new" routing tunnel are as follows:

1-2. One of the ports 504 receives a packet 528 and recognizes that the packet 528 is a routed IP packet 528 and as a result forwards the packet 528 to the IP routing logic unit 506. FIG. 6A is a diagram illustrating the different fields of the exemplary packet 528 which include a "Destination MAC" field 602 (containing a Router MAC address for ingress VLAN), a "Source MAC" field 604 (containing a source MAC address), a "Protocol Type" field 606 (containing 0x800 which indicates that the packet 528 is an IP packet 528) and an "Original IP Header" field 608 (note: the original packet 528 also contains additional fields 610 but these particular fields 610 are not relevant to the present discussion).

3-5. The IP routing logic unit 506 receives the packet 528 and then takes the destination IP address in the "Original IP Header" and performs a table lookup with the routing/ARP table 508 and the interface table 510 to determine how to route the packet 528 (note: the CPU 514 populates these particular tables 508 and 510). Since, the routing/ARP table 508 indicates the next hop is a "new" tunnel, the IP routing logic unit 506 reformats the packet 528 into packet 530 as follows: (a) the "Destination MAC" field 602 and the "Source MAC" field 604 are set to contain a special internal MAC address which is used internally to identify that the re-formatted packet 530 is going to require tunnel handling for a specific new tunnel; (b) the TTL is decremented within the "Original IP Header" field 608'; and (c) the destination port is the CPU's port (i.e., the device driver 516). In one embodiment, the different possible special MAC addresses are composed with a special range of bytes that identifies specific tunnels where the low byte is the index into the Tunnel Fast Path Table 526 (see step 9).

Figure 6B:
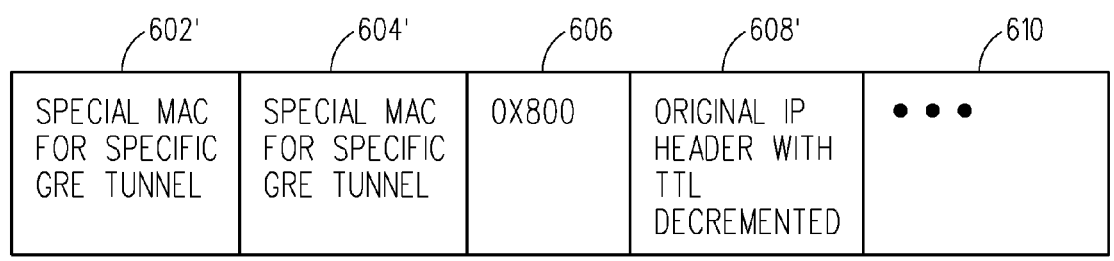

FIG. 6B is a diagram illustrating the different fields of an exemplary re-formatted original packet 530 which include a "Destination MAC" field 602' (containing the special MAC address), a "Source MAC" field 604' (containing the special MAC address), a "Protocol Type" field 606 (containing 0x800 which indicates that the packet 530 is an IP packet 530) and an "Original IP Header" field 608' (note 1: the TTL is decremented within the Original IP Header field 608')(note 2: the re-formatted packet 530 also contains the additional fields 610).

6-7. The device driver 516 (packet dispatcher 516) receives the re-formatted packet 530 and recognizes that the re-formatted packet 530 requires tunneling based on the special MAC address (which is located in the "Destination MAC" field 602') and forwards the re-formatted packet 530 to the fast path handler 524.

8-10. The fast path handler 524 receives the re-formatted packet 530 and performs a table lookup within the tunnel fast path table 526 using the low byte of the special MAC address as an index to obtain header information which is going to be used to re-format packet 530. The fast path handler 524 then uses the retrieved header information to create a re-formatted packet 532. In one embodiment, the retrieved header information includes: (a) a destination IP address (tunnel IP header); (b) a source IP address (tunnel IP header); (c) a VLAN identifier; (d) a destination MAC address (next hop MAC); (e) a source MAC address (router MAC for egress VLAN); and (f) an egress port (note 1: the IP protocol stack 518 as shown interfaces with the routing/ARP table 520 and the interface table 522 to populate the tunnel fast path table 526) (note 2: if the tunnel fast path table 526 does not contain the header information for a particular packet then the IP protocol stack 518 interfaces with the routing/ARP table 520 and the interface table 522 to obtain this header information (e.g., ARP data) and then it populates the tunnel fast path table 526).

Figure 6C:
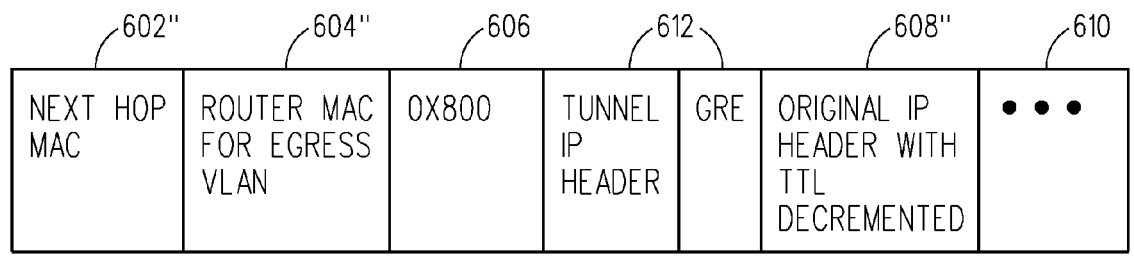

FIG. 6C is a diagram illustrating the different fields of an exemplary re-formatted original packet 532 which include a "Destination MAC" field 602″ (containing the next hop MAC), a "Source MAC" field 604″ (containing the router MAC for egress VLAN), a "Protocol Type" field 606 (containing 0x800 which indicates that the packet 532 is an IP packet 532), a "Tunnel IP Header/GRE" field 612 (containing the destination IP address and the source IP address) and an "Original IP Header" field 608″ (note 1: the TTL is decremented within the Original IP Header field 608″) (note 2: the re-formatted packet 532 also contains the additional fields 610).

11. The fast path handler 524 routes the second re-formatted packet 532 to the egress packet logic unit 512 (which is located within the ASIC 502).

12-13. The egress packet logic unit 512 routes the second re-formatted packet 532 to the correct egress port 504 which then forwards the second re-formatted packet 532 from a specific tunneled interface on a specific egress path to the next downstream switch which de-tunnels the second re-formatted packet 532.

Figure 7:
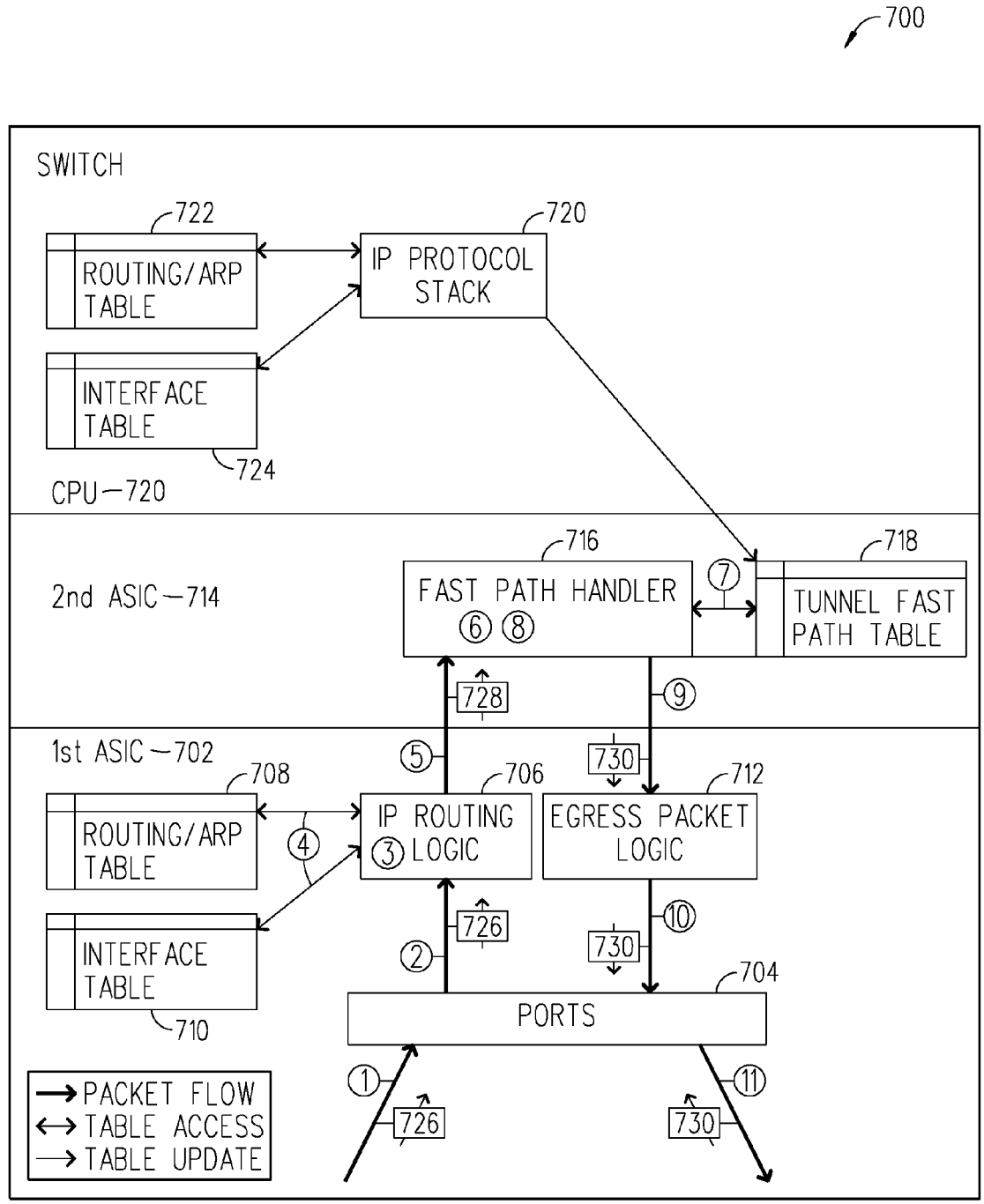
FIG. 7 is a block diagram which is used to help explain how a switch with an "old" ASIC is able to implement a "new" routing tunnel more effectively than the traditional switch shown in FIG. 3 in accordance with a second embodiment the present invention.
Figure 8A:
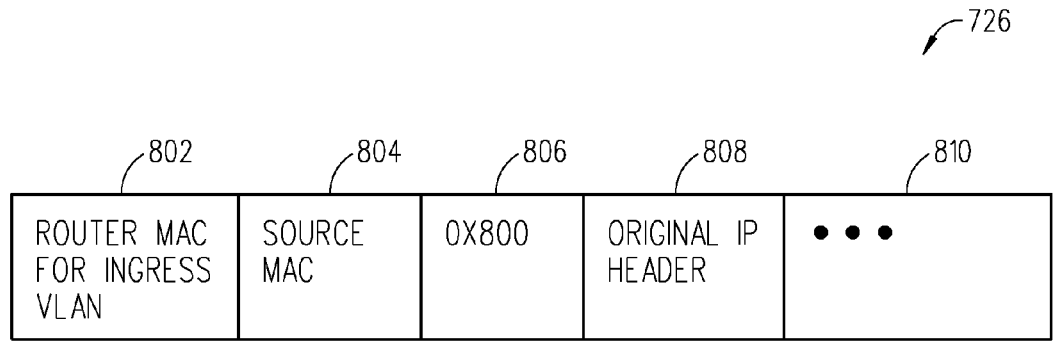
FIGS. 8A-8C are diagrams which illustrate the different fields of the packet as it is re-formatted two different times within the switch shown in FIG. 7 in accordance with the second embodiment of the present invention.

Referring to FIG. 7, there is a block diagram of a switch 700 in accordance with a second embodiment of the present invention. As shown, the switch 700 includes a first ASIC 702 which has ports 704, an IP routing logic unit 706, a routing/ARP table 708, an interface table 710, and an egress packet logic unit 712. In addition, the switch 700 has a second ASIC 714 which includes a fast path handler 716 and a tunnel fast path table 718. Moreover, the switch 700 includes a CPU 720 which has an IP protocol stack 720, a routing/ARP table 722 and an interface table 724. The steps associated with how the switch 700 is able to implement a "new" routing tunnel are as follows:

1-2. One of the ports 704 receives a packet 726 and recognizes that the packet 726 is a routed IP packet 726 and as a result forwards the packet 726 to the IP routing logic unit 706. FIG. 8A is a diagram illustrating the different fields of the exemplary packet 726 which include a "Destination MAC" field 802 (containing a Router MAC address for ingress VLAN), a "Source MAC" field 804 (containing a source MAC address), a "Protocol Type" field 806 (containing 0x800 which indicates that the packet 726 is an IP packet 726) and an "Original IP Header" field 808 (note: the original packet 726 also contains additional fields 810 but these particular fields 810 are not relevant to the present discussion).

3-5. The IP routing logic unit 706 receives the packet 726 and then takes the destination IP address in the "Original IP Header" and performs a table lookup with the routing/ARP table 708 and the interface table 710 to determine how to route the packet 726 (note: the CPU 720 populates tables 708 and 710). Since, the routing/ARP table 708 indicates the next hop is a "new" tunnel, the IP routing logic unit 706 reformats the packet 726 into packet 728 as follows: (a) the "Destination MAC" field 802 and the "Source MAC" field 804 are set to contain a special internal MAC address which is used internally to identify that the re-formatted packet 728 is going to require tunnel handling for a specific new tunnel; (b) the TTL is decremented within the "Original IP Header" field 808'; and (c) the destination port is the second ASIC 714. In one embodiment, the different possible special MAC addresses are composed with a special range of bytes that identifies a specific tunnel where the low byte is the index into the Tunnel Fast Path Table 718 (see step 7).

Figure 8B:
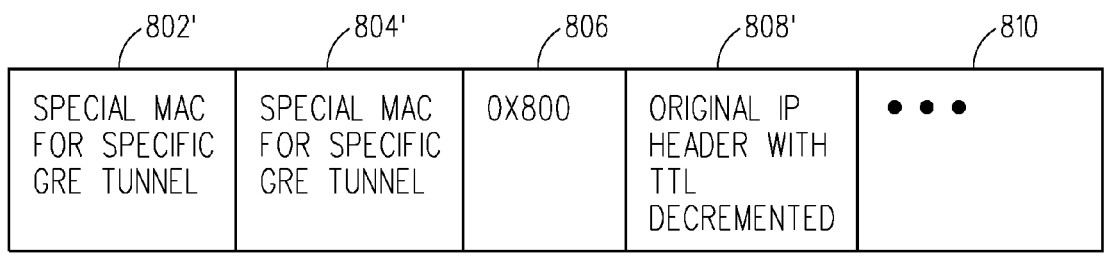

FIG. 8B is a diagram illustrating the different fields of an exemplary re-formatted original packet 728 which includes a "Destination MAC" field 802' (containing the special MAC address), a "Source MAC" field 804' (containing the special MAC address), a "Protocol Type" field 806 (containing 0x800 which indicates that the packet 728 is an IP packet 728) and an "Original IP Header" field 808' (note 1: the TTL is decremented within the Original IP Header field 808')(note 2: the re-formatted packet 728 also contains the additional fields 810).

6-8. The fast path handler 716 (which is part of the second ASIC 714) receives the re-formatted packet 728 and recognizes that the re-formatted packet 728 requires tunneling based on the special MAC address (which is located in the "Destination MAC" field 802'). Then, the fast path handler 716 performs a table lookup within the tunnel fast path table 718 using the low byte of the special MAC address as an index to obtain header information which is going to be used to re-format packet 728. Thereafter, the fast path handler 716 uses the retrieved header information to create a re-formatted packet 730. In one embodiment, the retrieved header information includes: (a) a destination IP address (tunnel IP header); (b) a source IP address (tunnel IP header); (c) a VLAN identifier; (d) a destination MAC address (next hop MAC); (e) a source MAC address (router MAC for egress VLAN); and (f) an egress port (note 1: the IP protocol stack 720 as shown interfaces with the routing/ARP table 722 and the interface table 724 to populate the tunnel fast path table 718) (note 2: if the tunnel fast path table 718 does not contain the header information for a particular packet then the IP protocol stack 720 interfaces with the routing/ARP table 722 and the interface table 724 to obtain this header information (e.g., ARP data) and then it populates the tunnel fast path table 718).

Figure 8C:
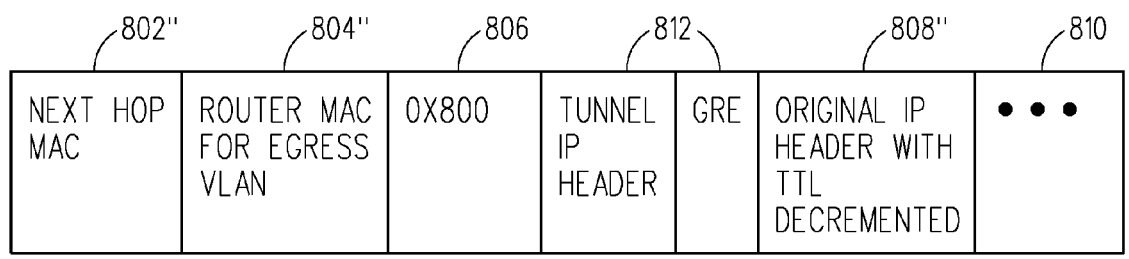

FIG. 8C is a diagram illustrating the different fields of an exemplary re-formatted original packet 730 which includes a "Destination MAC" field 802″ (containing the next hop MAC), a "Source MAC" field 804″ (containing the router MAC for egress VLAN), a "Protocol Type" field 806 (containing 0x800 which indicates that the packet 730 is an IP packet 730), a "Tunnel IP Header/GRE" field 812 (containing the destination IP address and the source IP address) and an "Original IP Header" field 808″ (note 1: the TTL is decremented within the Original IP Header field 808″) (note 2: the re-formatted packet 730 also contains the additional fields 810).

9. The fast path handler 716 routes the second re-formatted packet 730 to the egress packet logic unit 712 (located within the first ASIC 702).

10-11. The egress packet logic unit 712 routes the second re-formatted packet 730 to the correct egress port 704 which then forwards the second re-formatted packet 730 from a specific tunneled interface on a specific egress path to the next downstream switch which de-tunnels the second re-formatted packet 730.

Note: The routing of packets within the switches 500 and 700 which use known tunnels has not been shown or described herein. Plus, it should be appreciated that the switches 500 and 700 shown herein include only the components which are necessary to help describe and explain the present invention.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the spirit of the invention as set forth and defined by the following claims.

The invention claimed is:

1. A switch, comprising:
    an application specific integrated circuit (ASIC); and
    a central processing unit (CPU), where said ASIC receives a first formatted packet, performs a first table lookup using a destination address in the first formatted packet, revises the first formatted packet to be a second formatted packet which has a special destination address added thereto and routes the second formatted packet to said CPU which recognizes that the second formatted packet is to be a tunneled packet and performs a second table lookup using at least a portion of the special destination address and revises the second formatted packet to be a third formatted packet which is the tunneled packet that is subsequently outputted from a specific tunnel interface on a specific egress path.

2. The switch of claim 1, wherein said special destination address is a special Media Access Control (MAC) destination address.

3. The switch of claim 1, wherein said CPU performs the second table lookup to determine the following header information which are then added to the third formatted packet:
    a destination Internet Protocol (IP) address;
    a source IP address;
    a Virtual Local Area Network (VLAN) identifier;
    a destination Media Access Control (MAC) address;
    a source MAC address; and
    an egress port.

4. A method for routing a packet at a switch which includes an application specific integrated circuit (ASIC) and a central processing unit (CPU), said method comprising the steps of:
    said ASIC performs the following steps:
        receiving a first formatted packet;
        performing a first table lookup using a destination address located in the first formatted packet to obtain a special destination address;
        revising said the first formatted packet to be a second formatted packet which has the special destination address added thereto; and
        routing the second formatted packet; and
    said CPU performs the following steps:
        receiving the second formatted packet;
        recognizing that the second formatted packet is to be a tunneled packet;
        performing a second table lookup using at least a portion of the special destination address to obtain header information;
        revising the second formatted packet to be a third formatted packet which has the header information added thereto; and
        routing the third formatted packet; and
    said ASIC performs the following steps:
        receiving the third formatted packet; and
        outputting the third formatted packet from a specific tunnel interface on a specific egress path.

5. The method of claim 4, wherein said special destination address is a special Media Access Control (MAC) destination address.

6. The method of claim 4, wherein said CPU performs the second table lookup to determine the following header information which are then added to the third formatted packet:
    a destination Internet Protocol (IP) address;
    a source IP address;
    a Virtual Local Area Network (VLAN) identifier;
    a destination Media Access Control (MAC) address;
    a source MAC address; and
    an egress port.

7. A switch, comprising:
    an application specific integrated circuit (ASIC) which includes:
        a port that receives a first formatted packet; and
        an IP routing logic unit that receives the first formatted packet and performs a first table lookup using a destination address in the first formatted packet to obtain a special destination address and then revises the first formatted packet to be a second formatted packet which has the special destination address added thereto and then routes the second formatted packet; and
    a central processing unit (CPU) which includes:
        a device driver that receives the second formatted packet and recognizes that the second formatted packet is to be a tunneled packet; and
        a fast path handler that performs a second table lookup using at least a portion of the special destination address therein to obtain header information and then revises the second formatted packet to be a third formatted packet which has the header information added thereto and then routes the third formatted packet; and
    said ASIC further includes:
        an egress packet logic unit that receives the third formatted packet and routes the third formatted packet; and
        said port receives the third formatted packet and outputs the third formatted packet which is a tunneled packet from a specific tunnel interface on a specific egress path.

8. The switch of claim 7, wherein said special destination address is a special Media Access Control (MAC) destination address.

9. The switch of claim 7, wherein said CPU performs the second table lookup to determine the following header information which are then added to the third formatted packet:
    a destination Internet Protocol (IP) address;
    a source IP address;
    a Virtual Local Area Network (VLAN) identifier;
    a destination Media Access Control (MAC) address;
    a source MAC address; and
    an egress port.

10. A switch, comprising:
    a first application specific integrated circuit (ASIC) which includes:
        a port that receives a first formatted packet; and
        an IP routing logic unit that receives the first formatted packet and performs a first table lookup using a destination address in the first formatted packet to obtain a special destination address and then revises the first formatted packet to be a second formatted packet which has the special destination address added thereto and then routes the second formatted packet; and a second ASIC which includes:

a fast path handler that receives the second formatted packet and recognizes that the second formatted packet is to be a tunneled packet and performs a second table lookup using at least a portion of the special destination address therein to obtain header information and then revises the second formatted packet to be a third formatted packet which has the header information added thereto and then routes the third formatted packet; and said first ASIC further includes:

an egress packet logic unit that receives the third formatted packet and routes the third formatted packet; and said port receives the third formatted packet and outputs the third formatted packet which is a tunneled packet from a specific tunnel interface on a specific egress path.

11. The switch of claim 10, further comprising a central processing unit (CPU) which provides information that is used to enable the first table lookup and the second table lookup.

12. The switch of claim 10, wherein said special destination address is a special Media Access Control (MAC) destination address.

13. The switch of claim 10, wherein said second ASIC performs the second table lookup to determine the following header information which are then added to the third formatted packet:

a destination Internet Protocol (IP) address;
a source IP address;
a Virtual Local Area Network (VLAN) identifier;
a destination Media Access Control (MAC) address;
a source MAC address; and
an egress port.

* * * * *